United States Patent
Lewer

(10) Patent No.: US 10,138,569 B2
(45) Date of Patent: Nov. 27, 2018

(54) WELD CLEANING FLUID

(75) Inventor: Simon Lewer, Camden (AU)

(73) Assignee: Ensitech IP PTY LLP, Emu Plains, New South Wales (AT)

( * ) Notice: Subject to any disclaimer, the term of this patent is extended or adjusted under 35 U.S.C. 154(b) by 627 days.

(21) Appl. No.: 14/345,049

(22) PCT Filed: Sep. 14, 2012

(86) PCT No.: PCT/AU2012/001098
§ 371 (c)(1),
(2), (4) Date: Sep. 18, 2014

(87) PCT Pub. No.: WO2013/036999
PCT Pub. Date: Mar. 21, 2013

(65) Prior Publication Data
US 2015/0027903 A1    Jan. 29, 2015

(30) Foreign Application Priority Data

Sep. 15, 2011 (AU) ................................ 2011903778

(51) Int. Cl.
*C25F 3/16* (2006.01)
*C25F 1/04* (2006.01)
*C25F 7/00* (2006.01)
*B23H 3/00* (2006.01)

(52) U.S. Cl.
CPC ................ *C25F 3/16* (2013.01); *B23H 3/00* (2013.01); *C25F 1/04* (2013.01); *C25F 7/00* (2013.01)

(58) Field of Classification Search
None
See application file for complete search history.

(56) References Cited

U.S. PATENT DOCUMENTS

| | | | |
|---|---|---|---|
| 3,492,238 A | 1/1970 | Wohlberg | |
| 4,431,501 A | 2/1984 | Leppanen | |
| 6,156,129 A * | 12/2000 | Hlivka | C11D 3/2086 134/42 |
| 2003/0178320 A1* | 9/2003 | Liu | B23H 3/08 205/640 |
| 2004/0226654 A1* | 11/2004 | Hongo | C25F 7/00 156/345.11 |
| 2006/0249394 A1 | 11/2006 | Jai et al. | |
| 2009/0139875 A1 | 6/2009 | Kim et al. | |

* cited by examiner

*Primary Examiner* — Nicholas A Smith
(74) *Attorney, Agent, or Firm* — Galgano IP Law PLLC; Thomas M. Galgano

(57) ABSTRACT

The invention relates to a weld cleaning fluid, and method of cleaning weld or discoloration especially on stainless steel. Stainless steel welds, such as those done by TIG welding, require cleaning to remove the resulting surface discoloration and also to passivate the steel. This is often done using an electro-cleaning apparatus with the assistance of electrolyte cleaning fluids. A new cleaning fluid has been developed that has a generally neutral pH, instead of the highly acidic nature of previously used fluids, which avoids environmental and safety issues. The cleaning fluid composition preferably has potassium or sodium orthophosphate salts as the main active ingredient, or similar such salts, and has a pH of around 7. It may also include a sequestering or chelating agent such as a sodium and/or potassium salt of EDTA, and coloring and fragrance.

19 Claims, No Drawings

WELD CLEANING FLUID

TECHNICAL FIELD

The present invention relates to a weld cleaning fluid. Stainless steel welds, such as those done by TIG welding, require cleaning to remove the resulting surface discolouration and also to passivate the steel. This is commonly carried out using an electro-cleaning apparatus with the assistance of electrolyte cleaning fluids. Typically, these cleaning fluids contain phosphoric acid as their primary active ingredient, and as a consequence have a low (acidic) pH. After use, these fluids pose a problem of disposal in an environmentally acceptable way, and being acidic require greater care in order to be used safely. A new cleaning fluid has been developed that has a generally neutral pH, avoiding these environmental and safety issues. This fluid has also been found to give an improved result over existing cleaning fluids. The cleaning fluid composition of the present invention preferably has sodium and/or potassium orthophosphate as the main active ingredient, or similar such salts, and has a pH of around 7.

BACKGROUND ART

When stainless steel is welded, the resulting join and its surrounding area are often discoloured and this area (if untreated) then becomes susceptible to corrosion. This weld burn that appears, after welding with a TIG (ie, "Tungsten Inert Gas" arc welding) welder for instance, therefore normally has to be cleaned, and this is often carried out using an electro-chemical cleaning system in recent times. That cleaning system involves using an electro-cleaning unit that applies a low voltage, high current, flow in a circuit with the metal connected as the anode. A tool, providing the cathode, is rubbed over the heat tinted sections of the weld and its surrounding metal, with the aid of an electrolytic weld cleaning fluid, to complete the circuit. The tool heats and passivates the metal surface, and removes the unwanted discolouration. The passivation treatment restores its natural protection against corrosion to the stainless steel.

In addition, when there is a need to provide a bright mirror finish to the stainless steel, which is particularly important when the steel article is used in the food industry, or when a decorative appearance is needed, for example, then a similar system for electro-polishing is also utilised using the same type of electrolytic polishing fluid.

Traditionally in the past, weld discolouration was removed using a pickling paste that usually consisted of a composition of nitric acid and hydrofluoric acid. This paste was manually wiped on to the stains on the welds and the surrounding area, left in place until the stain had been removed, and then washed off. These acids are dangerous and difficult to apply and remove. The waste and fumes that result have to be handled carefully, being dangerous to breathe in or have skin contact with, and the waste liquid generated is environmentally hazardous to dispose of.

More recently, electro-chemical cleaning or polishing has been utilised to achieve this same purpose, and this has been found to often give a better result. Electro-chemical cleaning (or "electro-cleaning") also produces a better finish to the metal, since pickling will roughen the surface while electro-cleaning smoothes it.

Electro-cleaning (or polishing) basically involves using an electrical power source that is connected in a circuit to the steel surface which becomes the anode, and with an electrically conductive "wand" tool comprising the cathode. The wand can be in the form of a copper electrode, surrounded by a nylon sponge or felt pad which is soaked with an electrolyte solution. Until the current invention, this electrolyte solution was normally an aqueous solution of phosphoric acid (ie, orthophosphoric acid $H_3PO_4$). This wand is used to rub and corrode away the top surface layers removing the discolouration and iron oxide surface imperfections left from the welding. A worker holds the wand by an insulated handle and presses it over the tinted area until the normal stainless steel sheen is returned and the discolouration removed.

More recently, the applicants for the present invention (Ensitech), have developed an improved electro-cleaning system that utilises a conductive carbon bristled brush (the "TIG Brush™") that is used in place of the felt or nylon pad type of wand. There is a power source that produces a low voltage, high current, output that is used to remove the discolouration from stainless steel TIG welds when the electrical current is flowing in the circuit. The brush is dipped in the electrolytic cleaning solution and then the tips of the conductive bristles are dragged across the tinted surface area. The bristles allow the brush to penetrate into constricted areas, and any crevices or pits in the metal, giving an excellent result. The electrical current passing via the brush is thought to create a high temperature area on the surface of the steel that hastens the deoxidising action of the cleaning fluid. The iron oxides on the surface are dissolved to release free ferric and ferrous ions and oxygen gas.

In addition, the welds in the stainless steel and the surrounding area then require passivation to restore its resistance to corrosion. Stainless steel is an alloy of iron that contains a significant amount (more than 10% and commonly 13% to 27%) of chromium. The "stainless" quality of this steel is caused by a thin durable film of chromium oxide that forms on its surface, which will be naturally formed by the oxidation of the stainless steel alloy with air or water. Welding disrupts this protective coating, and the iron oxides that instead form on the surface cause the unwanted heat tint staining, as well as allowing corrosion and pitting to occur subsequently. Passivation restores the protective chromium oxide surface layer by stripping away any iron oxides on the surface and simultaneously oxidising the chromium atoms present to form the new surface layer.

Passivation generally is the process of removing the unwanted iron particles on the surface and oxidising the chromium atoms that replace them, using an oxidising agent like an acid, or by contact with air or water. The Standard "ASTM A380", defines passivation to be "the removal of exogenous iron or iron compounds from the surface of stainless steel by means of a chemical dissolution, most typically by a treatment with an acid solution that will remove the surface contamination, but will not significantly affect the stainless steel itself." It also describes passivation as "the chemical treatment of stainless steel with a mild oxidant, such as a nitric acid solution, for the purpose of enhancing the spontaneous formation of the protective passive film."

For a long time, pickling and passivation of stainless steel involved using acids, especially nitric acid, or a mixture or nitric and hydrofluoric acids, or citric acid for stainless steel to be used in the food industry. More recently with both types of the electro-cleaning units mentioned above, an electrolytic and oxidising cleaning fluid has been used that consists of a solution of phosphoric acid in water, together with a small quantity of fragrance and colouring. This solution is acidic, with a low pH of approximately pH 1 to 3. Probably because of the historic use of acids, and their effectiveness with pickling and passivation, welding cleaning solutions have all been acidic in nature.

Some passivation and cleaning procedures used in the past have also used strongly basic or alkaline solutions with a high pH, for example using aqueous solutions of sodium hydroxide, often in sequence with the acid treatments.

These acidic (or basic) welding fluids create environmental problems with their disposal after use, and have to be used with great care by the workers carrying out the cleaning process to avoid splashing the fluid on to skin or into eyes.

It has now been found that using a weld cleaning fluid that has a close to neutral pH of around 7, can avoid at least some of the problems arising from the acidic or alkaline fluids used in the past. Surprisingly, it has been found that neutral pH weld cleaning and passivation fluids can give superior results over the low (or high) pH fluids. Additionally the cleaning and passivating treatment can proceed more quickly than with the prior known fluids, giving an economic benefit as well as exposing workers to less of the fumes that are given off during the cleaning process.

DISCLOSURE OF THE INVENTION

According to a first aspect of the invention there is provided a metal cleaning composition comprising an aqueous solution having a pH that is approximately neutral. Preferably, the metal cleaning composition is adapted to clean the weld tint from stainless steel. The solution contains a salt of an acid selected from any one or more of a phosphoric acid, nitric acid, sulfuric acid, hydrochloric acid or citric acid, and most preferably the acid is orthophosphoric acid, and a salt of a polyaminocarboxylic acid as a sequestering or chelating agent. It is preferred that the salt of the acid is selected from any one or more of potassium, sodium, ammonium, manganese or magnesium salts, and most preferably the salt is potassium and/or sodium. The salt of the acid may be one or more of the oxo anions of potassium phosphate, selected from $K_3PO_4$, $K_2HPO_4$, and $KH_2PO_4$, and is most preferably mostly tripotassium phosphate ($K_3PO_4$). Sodium salt may be used in place of some or all of the potassium salt.

When present, the $K_3PO_4$ (and its sodium and oxo anion equivalents, for example) may be present in an amount of from 10% to 50% by weight, and most preferably they may be present in an amount of about 35% by weight.

It is preferred that the sequestering or chelating agent is tetrasodium EDTA ($Na_4EDTA$), or dipotassium EDTA dihydrate ($K_2H_2EDTA$). Another preferred feature is that the composition may include at least one fragrance and/or colouring agent.

Another aspect of the invention is a method of cleaning or passivating a metal surface comprising the steps of: applying a low voltage high ampage electrical current to the metal being the anode, and wiping the surface with a conductive wand or brush being the cathode, forming an electrical circuit, whereby an electrolytic fluid is applied to the surface in contact with the wand or brush; characterised in that the electrolytic fluid comprising an aqueous solution with a pH that is approximately neutral, comprising a solution of a salt of an acid selected from any one or more of a phosphoric acid, nitric acid, sulfuric acid, hydrochloric acid or citric acid, and a salt of a polyaminocarboxylic acid as a sequestering or chelating agent. It is preferred that the metal surface is cleaned to remove weld tint from stainless steel.

Ideally, the electrolytic fluid may comprise a major part of the salt of the acid comprising one or more of the oxo anions of potassium phosphate, selected from $K_3PO_4$, $K_2HPO_4$, and $KH_2PO_4$. More preferably, the electrolytic fluid may comprise a major part of an aqueous solution of tripotassium phosphate ($K_3PO_4$) and its sodium and oxo anion equivalents. The salt of the polyaminocarboxylic acid is preferably tetrasodium EDTA or dipotassium EDTA dihydrate. The electrolytic fluid may contain at least one colouring agent and/or a fragrance.

In this specification, reference is made to cleaning and polishing discolouration arising from the welding of stainless steel. This is a preferred use for the present invention. However, the invention can also be utilised in connection with other types of steel and iron alloys, and for other metals and alloys, such as with copper or bronze for example. It can also be used when cleaning any discolouration or tarnish from metals or alloys that result from causes apart from welding.

The invention can also be applied to general cleaning of tarnish and oxidation from metal surfaces that have been discoloured through natural processes and general use. For instance, in the food industry there is a need to keep stainless steel or other metal surfaces, containers, conduits and the like spotless and with a mirror finish. The present invention can be used for this purpose, either with or without the electro-cleaning apparatus which is a preferred method of utilisation and application.

BEST MODES FOR CARRYING OUT THE INVENTION

The composition of the invention is preferably in the form of a neutralised aqueous solution of an acid, where the acid is preferably an phosphorous oxo acid, preferably orthophosphoric acid, or a combination of these. Of the anions of orthophosphoric acid, the $PO_4^{3-}$ salt is preferred, but the $HPO_4^{2-}$ and the $H_2PO_4^-$ are also preferred, and all three anions will generally exist in equilibrium. Additionally, other phosphoric acids, including the various polyphosphoric acids may be used. However, other acids, such as nitric acid, sulfuric acid, hydrochloric acid, citric acid or the like may be used. Preferably the solution has a pH of from 6 to 8, and most preferably it has a pH of around 7, and ideally in the range of from 6.8 to 7.2.

Preferably, the neutral solution is a salt of the acid, especially the potassium, sodium, ammonium, magnesium, manganese or the like salts, and most preferably is the potassium salt, or a mixture of potassium and sodium. These salts may be introduced to the composition as a hydroxide, which will react with the acids present. Other bases may be used, including those that react with the acid and leave no anion component behind, such as carbonates which produce carbon dioxide gas and water after reacting with the acid, for example. Alternatively, the salt may be added as is to the water present and dissolved. The components may be added both as a salt and as an acid or base, especially if there is a need to fine tune the pH of the resulting composition.

The amount of acid salt present in the cleaning solution is preferably from 10% to 60% by weight, and more preferably in the range from 30% to 40% by weight. When the acid salt is potassium phosphate, preferably it is present in an amount of 30% to 40% and most preferably as about 35% by weight. If other acid salts are used, then amounts are adjusted proportionally to the reference of $K_3PO_4$. More than one acid salt may be present. Additionally, the cleaning solutions of the invention may also be provided in more concentrated forms, to be further diluted by the user before actual use.

It is preferred that the weld cleaning fluid composition should contain a chelating agent or a sequestering agent.

One example of a preferred such agent is EDTA (ethylenediaminetetraacetic acid) and especially its sodium or potassium salts. Other suitable sequestering agents include other members of the polyaminocarboxylic acid family of agents, particularly the alkylenepolyaminepolycarboxylic acids and their salts. Other example include, EGTA (ethylene glycol tetraacetic acid), BAPTA (1,2-bis(o-aminophenoxy)ethane-N,N,N',N'-tetraacetic acid), and DTPA (diethylene triamine pentaacetic acid).

When a sequestering agent is present, it is preferably in the aqueous composition in an amount of from 0% to 20%, and most preferably from about 4% to 10%. When the tetra-sodium salt of EDTA ($Na_4$ EDTA) is used as a sequestering agent, it is present as an amount preferably from 4% to 10% and most preferably in an amount of about 6-7%, by weight. When the di-potassium salt of EDTA ($K_2H_2EDTA$) is used as a sequestering agent, it is present as an amount preferably from 4% to 10% and most preferably in an amount of about 5-6%, by weight. If other sequestering agents are used, the quantities are adjusted generally accordingly with reference to the preferred amount of $Na_4EDTA$. Combinations of more than one sequestering or chelating agent may be used. If the sequestering agent(s) chosen for inclusion should themselves be acidic or basic (ie, alkaline) in nature, then the pH of the resulting solution can be adjusted by altering the amount of phosphoric (or other) acid, or of the potassium hydroxide (or other) base or of any of the pH altering components present, so that the overall pH of the composition is around 7.

When a sequestering agent is present it functions to mop up the metal atoms liberated from the cleaning process, to stop them recombining with the surface of the stainless steel, and so as to remove the impurities that cause the unwanted discolouration.

The cleaning liquid of the invention may optionally include dyes or perfumes. Dyes are desirable to help distinguish the cleaning liquid from other similar liquids, and to prevent users from confusing the cleaning liquid from beverages, for example. Perfumes are helpful in disguising the sometimes unpleasant fumes that are given off from the electro-cleaning process, and also assist in preventing confusion with other liquid products.

One example of a suitable perfume is a "cherry blossom" fragrance that is available from Risdon International Pty Ltd, of Yennora NSW Australia. One example of a suitable colouring dye is the Ensitech dye #3, prepared by Ensitech Pty Ltd, which is based on red dye. Any other suitable known dyes or colouring agents, or perfumes may be used, especially those that are generally known for use in cleaning products. Those dyes and perfumes that do not chemically react with the other components are especially desirable for use in the cleaning liquids. Also, dyes (or perfumes) that do not react with stainless steel, or bond to the metals present, especially at high temperatures, are strongly desirable. Also, dyes that do not stain clothing or skin are preferred, as well as those which are easily washed away with water. Combinations of more than one of the suitable dyes and/or perfumes may also be employed.

When a dye is present, it generally should be present in an amount of from 0.0001% to 1%, and more preferably from about 0.005% to 0.02%, and most preferably about 0.01%. The amount of dye should be selected to give a reasonably visible tint to the cleaning liquid. When perfume is present, it generally should be present in an amount of from 0.0001% to 2%, and more preferably from about 0.01% to 0.04%, and most preferably about 0.025%. The amount of perfume to be added is selected to provide a noticeable odour when used, especially one that will function to disguise or ameliorate the fumes generated in the cleaning process.

The amount of dye should be selected to give a visible tint to the cleaning liquid. Different tints or intensities of tinting may be used to distinguish different formulations or concentrations of components. The amount of perfume present will depend on the actual fragrance used, and its intensity. Scents that can help disguise the fumes from the cleaning process, or that do not interact disagreeably with such fumes are desirable. Perfumes that are easily washed away, and that quickly dissipate are also advantageously chosen for use in the invention.

The composition may preferably be in the form of a dilute solution of the acid salt in water. However, it may be provided in a concentrated form which is diluted further before use. Alternatively, the composition may be provided to users as dry components that will be mixed with water and dissolved prior to use. But it is preferred to provide the cleaning solution in bottles already mixed with water, in the preferred concentration of components for actual use. The liquid may be conveniently provided in 1 liter or 5 liter bottles, for example.

Alternatively the composition of the invention may be in the form of a paste or gel, which may or may not be further diluted or dissolved before use. A gel or paste form of the cleaning fluid may be used advantageously in situations where the steel surfaces that need cleaning are oriented so that the fluid would otherwise run off, or where unwanted drips or spillage would present a problem.

The solvent used in the cleaning solution of the invention is water. However other solvents may optionally also be present, especially those that readily dissolve in water, and which permit the solution to act as an electrolyte. Normal tap water is generally suitable for use. Alcohols may be utilised as additional solvents, such as ethanol, methanol or propanol, for example. Additional solvents may be utilised so as to improve the ability of the other components to remain dissolved in the water, or to improve the washing and drying steps after their use on the metal. The solvent system utilised would permit the cleaning liquid to function as an electrolyte. Gelling agents may be present in order to provide the formulation as a gel or paste.

Other optional components may be present, including surfactants, or pH adjusting agents. Additionally, corrosion inhibitors may be included in the composition, especially those based on ethylenediamine or imidazoline derivatives.

The compositions of the present invention are generally prepared by dissolving the components into the water, and adjusting the quantity of water to bring the liquid to the preferred concentration for use.

One preferred approach is to dissolve the acid in a large quantity of water first. Then a neutralising base is added, until the pH is about 7, with this also preferably dissolved in water. The chemical reaction of neutalising an acid with an alkali is often an exothermic reaction, and can be violently exothermic, and so care must be taken, and normally the combination is carried out slowly with mechanical agitation of the mixture. Cooling measures can be applied as well. Then the other components may be added to the liquid. Once the liquid is cooled, it is then bottled or otherwise packaged. Another approach that can be used is to start from the acid salt, such as with tripotassiumphosphate, and dissolve that directly into water, and then add the other components.

Another alternative is to manufacture a composition by dissolving $KH_2PO_4$, $K_2HPO_4$ and $Na_2HPO_4$ or $NaH_2PO_4$ and $KH_2PO_4$ in water.

When EDTA is present, this also affect the pH and the anions present. When the components are dissolved and mixed together various reactions will occur. There is likely to be some neutralisation of the EDTA with KOH to form $K_2EDTA$ as well as neutralisation of $H_3PO_4$ with KOH which follows a neutralisation sequence as the KOH is consumed. The more KOH that is present, the more dissolved $K_3PO_4$ there will be present. Ideally there should be three mole of KOH for every mole of $H_3PO_4$, in order to have $K_3PO_4$. But there will also be some $OH^-$ consumed in the reaction with the EDTA. The neutralisation sequence will operate as follows:—

Sequential neutralisation steps for reacting $H_3PO_4$ with KOH.

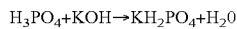

$H_3PO_4 + KOH \rightarrow KH_2PO_4 + H_2O$

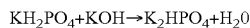

$KH_2PO_4 + KOH \rightarrow K_2HPO_4 + H_2O$

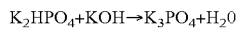

$K_2HPO_4 + KOH \rightarrow K_3PO_4 + H_2O$

Sodium EDTA neutralisation with $H_3PO_4$

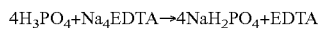

$4H_3PO_4 + Na_4EDTA \rightarrow 4NaH_2PO_4 + EDTA$

As KOH is added the following reactions occur:

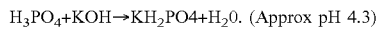

$H_3PO_4 + KOH \rightarrow KH_2PO4 + H_2O$. (Approx pH 4.3)

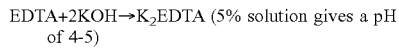

$EDTA + 2KOH \rightarrow K_2EDTA$ (5% solution gives a pH of 4-5)

At this point we would have: 0.19 moles $K_2EDTA$ (70 g/l as anhydrous)
0.78 mole $NaH_2PO_4$ (93.6 g/l as anhydrous)
2.17 mole $KH_2PO_4$ (295.3 g/l as anhydrous)
2 mole KOH (112.22 g/l)

The KOH will react with the $KH_2PO_4$ to form $K_2HPO_4$ and probably some $Na_2HPO_4$.

The reaction may run out of $OH^-$ ions and stops before reaching the equivalent of 100% of $K_3PO_4$ being present, because of the consumption of OH" ions by the EDTA. Therefore the composition will have a variety of salts in equilibrium in addition to the $K_3PO_4$. These include $NaH_2PO_4$, $KH_2PO_4$, $K_2HPO_4$, $K_3PO_4$, and $K_2EDTA$, for example. There preferably will be no free KOH remaining, or if there is then any KOH left over can make some $K_3PO_4$. It will be appreciated that these anions and cations will be in solution in the water, and so the salts are only identifiable as such if it is desired to prepare the compositions from the salts themselves, rather than by neutralisation of the acid and base moieties.

Example 1

A composition for use as a weld cleaning liquid was prepared as follows.

| Component | % by weight (Total = 100%) |
|---|---|
| Phosphoric acid ($H_3PO_4$) | 25% |
| Water | ~58.7% |
| Potassium hydroxide (KOH) | 10% |
| Sequestering agent ($Na_4 \cdot EDTA$) | 6.3% |
| Fragrance (Risden Cherry Blossom) | 0.025% |
| Colouring (Ensitech Dye 3) | 0.0% |

This formulation was prepared by dissolving the required amount of phosphoric acid in water; tap water was used. Then the potassium hydroxide was added gradually with stirring; this reaction is exothermic, and care must be taken to not allow the solution to heat up too vigorously or quickly. The sodium EDTA was then added, along with the colouring and fragrance components. The pH of the resulting solution was tested to be a pH of 7. The resulting liquid composition is bottled in 1 liter and 5 liter bottles for eventual use.

The amount of potassium hydroxide may be varied, to ensure that the pH of the final product is 7.

Example 2

A composition for use as a weld cleaning liquid was prepared as follows.

| Component | % by weight (Total = 100%) |
|---|---|
| Phosphoric acid ($H_3PO_4$) (75% w/w) | 28.3% |
| Sequestering agent ($Na_4 \cdot EDTA \; 4 \cdot H_2O$) | 6.3% |
| Potassium hydroxide (KOH) (50% w/w) | 37.6% |
| Water | ~28.3% |
| Fragrance (Risden Cherry Blossom) | 0.025% |
| Colouring (Ensitech Dye 3) | 0.01% |

This formulation was prepared by dissolving the required amount of phosphoric acid in tap water. The $Na_4$ EDTA and then the KOH components were added gradually with stirring. The reaction is exothermic, and care must be taken to not allow the solution to heat up too vigorously or quickly. The pH of the resulting solution was adjusted to have a pH of between 6.8 to 7. The colouring and fragrance components were then added. The resulting liquid composition is bottled in 1 liter and 5 liter bottles for eventual use.

The amount of potassium hydroxide may be varied, to ensure that the pH of the final product is 6.8 to 7. This depends on the concentration of actual KOH in the KOH flake or liquid which varies between manufacturers.

Example 3

Another composition for use as a weld cleaning liquid was prepared as follows.

| Component | % by weight (Total = 100%) |
|---|---|
| Sodium diHydrogen Orthophosphate ($NaH_2PO_4$) | 6.8% |
| Potassium diHydrogen Orthophosphate ($KH_2PO_4$) | 21.7% |
| Sequestering agent ($K_2H_2 \cdot EDTA \; 4 \cdot H_2O$) | 5.6% |
| Potassium hydroxide (KOH) (70% w/w) | 16.5% |
| Water | ~49.4% |
| Fragrance (Risden Cherry Blossom) | 0.002% |
| Colouring & Fragrance | 0.01% |

This formulation was prepared by dissolving the required amount of the orthophosphate salts in tap water. Into this the sequestering agent and then the KOH components were added gradually with stirring. The pH of the resulting solution was adjusted to have a pH of 7. The colouring, red and yellow dye, and fragrance components were then added. The resulting liquid composition is bottled in 1 liter and 5 liter bottles for eventual use.

The amount of potassium hydroxide may be varied, to ensure that the pH of the final product is 6.8 to 7. The actual amount required depends on the concentration of actual KOH in the KOH flake or liquid used, which can vary between manufacturers.

Example 4

The compositions of the invention were tested to determine their efficacy in cleaning and passivating stainless steel welds in accordance with suitable Standards. The weld cleaning composition was used with Ensitech's TIG Brush to clean samples of 316 and 445 stainless steel.

The formulation of Example 2 was used, and tested in accordance with ASTM Standard A967-05 "Chemical Passivation Treatments for Stainless Steel Parts". Practice 14, 17 and 18 were used as the most appropriate guide for determining the performance of the weld cleaning fluid of the invention. Additionally, the fluid was tested in accordance with ATSM Standard B912-02 "Passivation of Stainless Steels using Electopolishing", because its Section 6 test procedures call for the same tests as in ATSM A967-05.

Multiple samples were tested according to the Standard, and all treatments were performed in triplicate. Both welded (TIG welded) and unwelded samples were treated and tested for both 316 and 445 stainless steel. Both the 316 and 445 stainless steel were tested for passivation according to ASTM A967-05 Practice A—Water Immersion Test. The 316 samples were tested for passivation as per ASTM A967-05 Practice E, Potassium ferricyanide—nitric acid test and a ferrous sulfate spike was added to a blank piece of 316 stainless steel acting as a positive control. The 445 samples were tested for passivation as per ASTM A967-06 Practice D—Copper Sulfate Test. A conventional weld cleaning fluid, consisting essentially of a 50% solution of phosphoric acid in water was also tested as a positive control.

The formulation according to the present invention performed exceptionally well, and passed all the ATSM tests for passivation. All the welded 316 samples cleaned according to the present invention showed no signs of corrosion in the water immersion test, and negative results for free iron in the potassium ferricyanide—nitric acid test. All the welded 445 samples cleaned according to the invention showed no signs of corrosion in the water immersion test, and negative results for free iron in the copper sulfate test.

The term "comprises/comprising" when used in this specification is taken to specify the presence of stated features, integers, steps or components. However, the term does not preclude the presence or addition of one or more additional features, integers, steps or components or groups thereof.

It will be apparent that obvious variations or modifications may be made which are in accordance with the spirit of the invention and which are intended to be part of the invention, and any such obvious variations or modifications are therefore within the scope of the invention. Although the invention is described above with reference to specific embodiments and examples, it will be appreciated by those skilled in the art that it is not to be limited to just those embodiments.

INDUSTRIAL APPLICABILITY

The invention can be utilised in the welding industry to clean weld tinting from stainless steel, and to polish stainless steel welds and surfaces. It is also useable for cleaning metal surfaces in other situations.

The invention claimed is:
1. A stainless steel cleaning composition, comprising:
    an aqueous solution having a pH that is approximately neutral, said aqueous solution having from more than 30% to 60% by weight of a phosphoric acid salt, and having up to 20% by weight of a salt of a polyaminocarboxylic acid as a sequestering or chelating agent,
    wherein said acid salt is selected to induce passivation of stainless steel through oxidation of chromium atoms within the stainless steel, and
    all optional components of said composition are selected to be chemically unreactive with, and non-chemically-bonding to, metals.
2. The composition of claim 1, wherein:
    said phosphoric acid salt comprises at least one member selected from the group consisting of potassium, sodium, ammonium, manganese, and magnesium salts.
3. The composition of claim 2, wherein:
    said phosphoric acid salt comprises a member selected from the group consisting of a potassium salt, a sodium salt, and a potassium salt and a sodium salt.
4. The composition of claim 1, wherein:
    said phosphoric acid salt comprises at least one member selected from the group consisting of $K_3PO_4$, $K_2HPO_4$, $KH_2PO_4$, and $NaH_2PO_4$.
5. The composition of claim 1, wherein:
    said phosphoric acid salt is substantially tripotassium phosphate ($K_3PO_4$).
6. The composition of claim 4, wherein:
    said phosphoric acid salt is present in an amount of from 30% to 50% by weight of the aqueous solution.
7. The composition of claim 4, wherein:
    said phosphoric acid salt is present in an amount of about 35% by weight.
8. The composition of claim 1, wherein:
    said salt of the polyaminocarboxylic acid is present in an amount of from 4% to 10% by weight of the aqueous solution.
9. The composition of claim 1, wherein:
    said composition comprises a member selected from the group consisting of at least one fragrance, at least one coloring agent, and at least one fragrance and at least one coloring agent.
10. The composition of claim 1, wherein:
    the pH is between 6 and 8.
11. The composition of claim 10, wherein:
    the pH is between 6.8 and 7.2.
12. A method of cleaning or passivating a stainless steel surface, comprising the steps of:
    applying an electrical current to the stainless steel being the anode, and
    wiping the surface with a conductive wand or brush being the cathode, in a circuit,
    whereby an electrolytic fluid is applied to the surface in contact with the wand or brush;
    wherein the electrolytic fluid comprises an aqueous solution of an acid salt with a pH that is approximately neutral, the aqueous solution having from more than 30% to 60% by weight of a phosphoric acid salt and having up to 20% by weight of a salt of a polyaminocarboxylic acid as a sequestering or chelating agent;
    said acid salt is selected to induce passivation of stainless steel through oxidation of chromium atoms within the stainless steel; and
    all optional components of the electrolytic fluid are selected to be chemically unreactive with, and non-chemically-bonding to, stainless steel.
13. The method of claim 12, wherein:
    the stainless steel surface is electropolished.

14. The method of claim 12, wherein:
said phosphoric acid salt comprises at least one member selected from the group consisting of $K_3PO_4$, $K_2HPO_4$, $KH_2PO_4$, and $NaH_2PO_4$.

15. The method of claim 12, wherein:
said phosphoric acid salt is tripotassium phosphate ($K_3PO_4$).

16. The method of claim 12, wherein:
said salt of the polyaminocarboxylic acid is at least one member selected from the group consisting of a sodium salt of EDTA, a potassium salt of EDTA, and a sodium and potassium salt of EDTA.

17. The method of claim 12, wherein:
said electrolytic fluid contains a member selected from the group consisting of at least one coloring agent, at least one fragrance, and at least one fragrance and at least one coloring agent.

18. The method of claim 12, wherein:
the pH is between 6 and 8.

19. The method of claim 12, wherein:
the pH is between 6.8 and 7.2.

* * * * *